Dec. 25, 1962          C. A. DONNA          3,070,375
MANURE SPREADER
Filed July 15, 1960          2 Sheets-Sheet 1
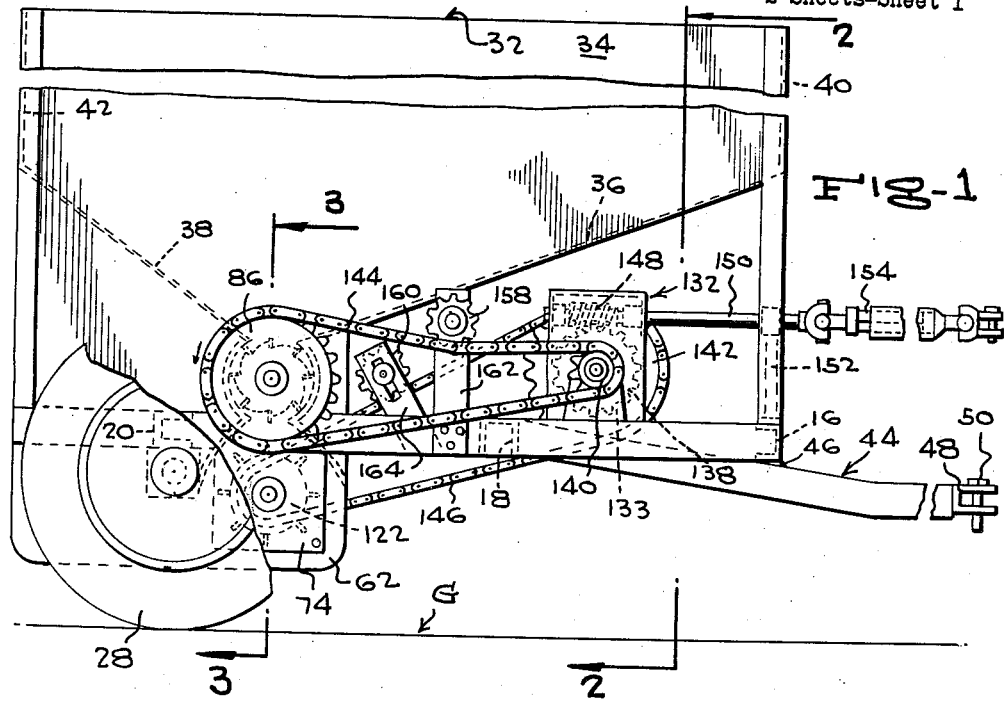
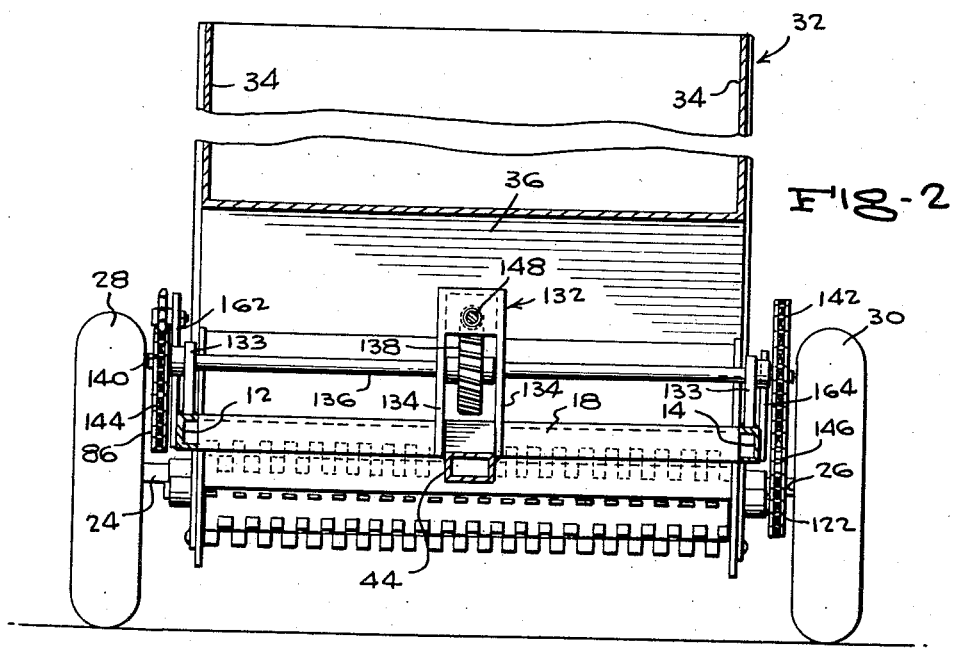
INVENTOR.
CLAUDE A. DONNA
BY
McMorrow, Berman & Davidson
ATTORNEYS

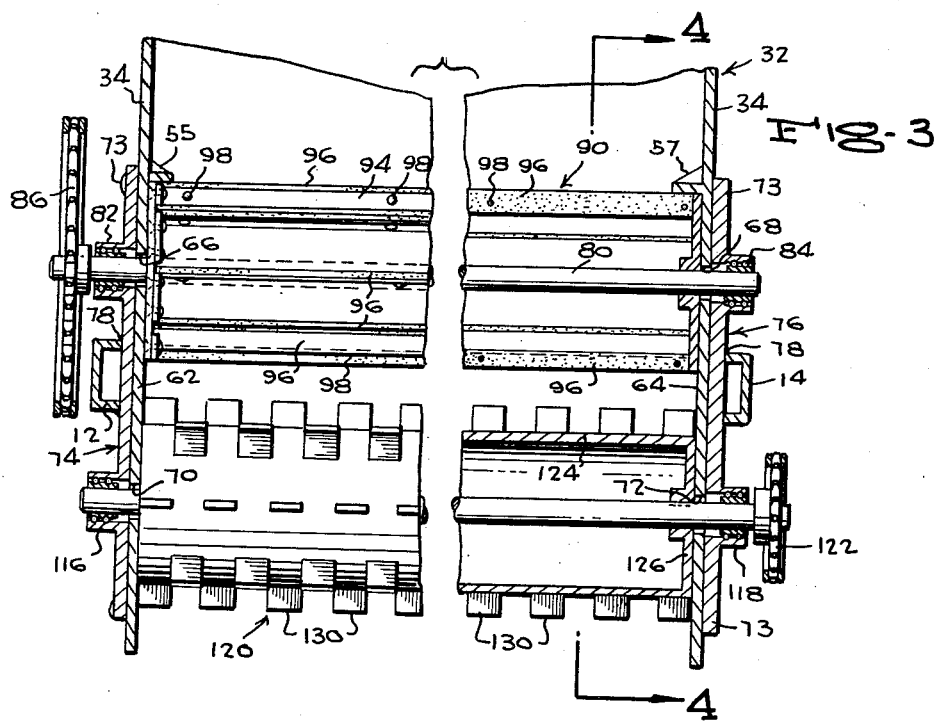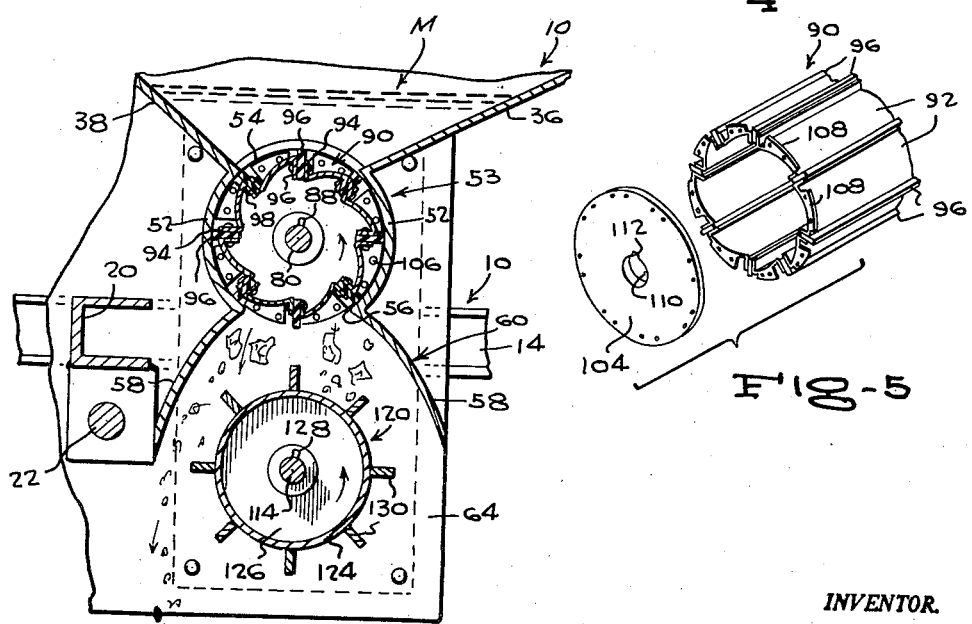

United States Patent Office 3,070,375
Patented Dec. 25, 1962

3,070,375
MANURE SPREADER
Claude A. Donna, 174 Railroad St., St. Johnsbury, Vt.
Filed July 15, 1960, Ser. No. 43,235
2 Claims. (Cl. 275—8)

This invention relates to improvements in spreaders for comminuted fluid material, and more particularly to a novel and improved spreader especially for feeding and spreading wet and fluid manure.

The primary object of the invention is the provision of an efficient and practical spreader of the kind indicated which enables the farmer to transport to and evenly spread on a field, manure which is too fluid to be contained and spread by ordinary manure spreaders, and from which fluid manure would drain out and be lost and be unevenly spread on a field. Fluid cow manure of the kind herein contemplated, is that obtained from cows fed by modern methods, including better quality roughage in the diet, and other less fluid manure made fluid by the addition of water thereto, for more effective soil action and more even distribution.

Another object of the invention is to provide a spreader of the character indicated above wherein the fluid manure in a wheel hopper is retained therein by a rotary feeding reel operating in a cylinder open at the top to a hopper discharge opening and open at its bottom to a spreading housing in which a rotary comminuting and spreading reel operates.

A further object of the invention is the provision, in a spreader of the character indicated above, of a feeder reel which has flexible and resilient blades which are in wiping contact with the sidewall of the feeding cylinder, and is so arranged that unwanted leakage of fluid manure from the hopper, through the cylinder is precluded, whether the feeding reel be in operation or not, and whereby damaged blades cannot occur when hard objects in the manure pass through the cylinder.

Other important objects and advantageous features of the invention will be apparent from the following description and the accompanying drawings, wherein, for purposes of illustration only, a specific form of the invention is set forth in detail:

In the drawings:

FIGURE 1 is a contracted side elevation, partly broken away, of a spreader of the present invention, showing its drive shaft connected to a power take-off shaft of a tractor;

FIGURE 2 is a transverse vertical section taken on the line 2—2 of FIGURE 1;

FIGURE 3 is a fragmentary vertical transverse section taken on the line 3—3 of FIGURE 1;

FIGURE 4 is a fragmentary vertical longitudinal section taken on the line 4—4 of FIGURE 3; and FIGURE 5 is a fragmentary and exploded perspective view showing the body of the feeding reel and an end member.

Referring in detail to the drawings, wherein like numerals designate like parts throughout the several views, the illustrated spreader comprises a longitudinally elongated horizontal open frame 10 having longitudinal side members 12 and 14, a first cross member 16, and an intermediate cross member 18, and a rear cross member 20. Fixed to the frame 10 beneath the rear cross member 20 is an axle 22 having pintles 24 and 26 extending out from opposite sides of the frame, on which are journaled ground-engaging wheels 28 and 30, respectively.

Mounted upon and extending the length of the frame 10 is a hopper 32 having perpendicular sidewalls 34 between which extend a V-shaped bottom composed of a relatively long rearwardly and downwardly angled forward portion 36 and a relatively short forwardly and downwardly angled rear portion 38. The hopper is closed at its ends by abbreviated front and rear walls 40 and 42 which extend between the sidewalls 34 about the bottom portions. A preferably tubular drawbar 44 is suitably fixed, at its rear end, to the intermediate frame cross member 18, has an intermediate part thereof fixed, as indicated at 46, to the underside of the cross member 16, and terminates, at its forward end, in a hitch clevis 48, which is spaced forwardly from the frame 10, and is adapted to be connected, as by a coupling pin 50 to the hitch of a tractor (not shown).

At the location where the depressed ends of the hopper bottom portions 36 and 38 come together, the same are spaced apart, on the same horizontal level, and have formed thereon, or otherwise suitably attached, opposed and similar concentric arcuate sidewalls 52 of a manure feeding cylinder 53. The cylinder sidewalls 52 extend downwardly from the hopper bottom portions and are about one-third of a circle in extent, so that uniform width intake and discharge openings 54 and 56, respectively, are provided at the top and bottom of the cylinder 53 which extend across the hopper between its sidewalls. Arcuate flanges 55 and 57 extend inwardly from the hopper sidewall extensions 62 and 64 and closely surround the top of the feeding reel 90, at the ends thereof, and into the ends of the upper feeding cylinder opening 54, so as to prevent fluid manure from entering the spaces between the ends of the reel 90 and the extensions 62 and 64. Fixed or formed on and extending along the lower edges of the cylinder sidewalls are similar and opposed and oppositely and downwardly curved, divergent sidewalls 58, of a spreading housing 60. The hopper sidewalls 12 and 14 have downward extensions 62 and 64, the extensions being formed with vertically spaced and vertically aligned upper and lower shaft clearance openings 66, 68, 70, and 72, respectively. Fixedly mounted, as indicated at 73, to the outer sides of the extensions 62 and 64 are bearing plates 74 and 76, which are fixed, intermediate their lengths, as indicated at 78, to the inward sides of the frame side members 12 and 14, respectively, so that lower portions of the extensions and the bearing plates extend downwardly from and below the frame 10.

A feeder reel shaft 80 extends axially through the cylinder 54 and through the upper clearance openings 66 and 68 in the extensions, and through anti-friction bearings 82 and 84 in the bearing plates 74 and 76, respectively, and a relatively large diameter sprocket wheel 86 is fixed on the end of the shaft 80 at a location adjacent to and spaced outwardly from the bearing plate 74. Keyed, as indicated at 88, on the shaft 80, within, and extending the length of the cylinder 54, is a feeding reel 90.

As shown in FIGURES 4 and 5, the feeding reel 90 is made up of a plurality of similar, relatively narrow, elongated, arcuate sections 92, preferably narrower than the cylinder openings 54 and 56, which have on and extending along their leading edges, radially outwardly extending radial flanges 94, and on their trailing edges, radially inwardly extending radial flanges 96, of the same width as the leading flanges 94. Positioned between adjacent trailing and leading flanges are inward edge portions of flat flexible and resilient blades 96, which are wider than the flanges, and the blades of the flanges are secured together, as by headed rivets 98, which pass therethrough. As clearly shown in FIGURE 4, the related flanges 94 and 96 are in registry with each other, so that the leading edges of the arcuate sections 92 are radially inwardly offset from their trailing edges, and so that the troughs between the adjacent blades 96 are deeper at their leading sides. The blades 96 are radially disposed and reach outwardly beyond the related flanges 94 and 96 and have free outer edges 102 which are tensioned into wiping contact with the inner sides of the cylinder sidewalls 52. This contact of the blades with the cylinder sidewalls 52 serves both to wipe the sidewalls clear of manure lumps and fluid, as the feeding reel 90 is rotated, and to seal the reel 90 in the cylinder, so that fluid cannot pass from the hopper 32, through the cylinder 53, to the spreading housing 60, whether the reel 90 is operating or stationary, so that dripping and loss of fluid manure is positively prevented. The flexibility of the blades 96 enables them to be deformed by and pass over hard objects, such as stones, in the manure, without injury to the blades or to the cylinder sidewalls 52. The reel 90 is mounted on its shaft by means of end plates 104 which are secured, as indicated at 106, to end flanges 108 on the ends of the sections 92. The end plates 104 have center openings 110, which receive the shaft 80, and have key slots 112 in their edges for the keys 88.

A spreading reel shaft 114 extends axially through the spreading housing 60 and through the lower clearance openings 70, 72 in the hopper sidewall extensions 62, 64, and is journaled at its ends, through anti-friction bearings 116 and 118 which are fixed on the bearing plates. The shaft 114 and the spreading reel 120 mounted thereon, are spaced at a substantial distance below the feeding reel 90, in vertical alignment therewith. Fixed on the right-hand end of the shaft 114 is a relatively small sprocket wheel 122.

The spreading reel 120 has an over-all diameter not substantially larger than that of the feeding reel 90, and comprises a closed and imperforate cylinder 124 having ends 126, through which the shaft 114 extends, and which are keyed therein, as indicated at 128. At equal circumferential intervals around the cylinder 124 are fixed rows of longitudinally spaced rigid radial blades 130 which extend the length of the cylinder 124, the last being of substantially the same length as the feeding cylinder 53.

For driving the feeding reel and the spreading reel in the same counterclockwise direction, as indicated in FIGURE 4, a gear box 132 is mounted on a rear part of the drawbar 44, with the lower portions of its sidewalls 134 fixed to the opposite sides of the drawbar 44, as shown in FIGURE 2. A transverse horizontal shaft 136 is journaled through the box 132 and through upstanding bearings 133 on the frame side members 12 and 14, and has a wormwheel 138 fixed thereon within the box. Fixed on related ends of the shaft 136 are relatively large and small sprocket wheels 140 and 142. The smaller sprocket wheel 140 is connected to the larger feeding reel shaft sprocket wheel 86, by means of a sprocket chain 144; and the larger sprocket wheel 142 is connected to the smaller sprocket wheel 122 on the spreading shaft, by means of a sprocket chain 146. Journaled longitudinally through the gear box 132 and in mesh with the top of the wormwheel 138 is a worm gear 148 which is fixed on the rear end of a forwardly extending horizontal drive shaft 150. The drive shaft 150 is supported, intermediate its ends, on a bearing standard 152 which rises from the front frame cross member 16, and has a universal coupling 154 on its forward end adapted to be connected to a tractor power take-off shaft. Chain tightener idler sprocket wheels 158 and 160 are mounted on uprights 162 and 164 fixed on the frame side members 12 and 14, respectively, and bear downwardly upon the sprocket chains 144 and 146, respectively, between the gear box 132 and the feeding and spreading assembly.

In operation, the spreader being drawn forwardly along the ground, at a suitable speed, and the drive shaft 150 being rotated at a suitable related speed, fluid manure M present in the hopper 32, falls through the top feeding cylinder opening 54 and onto the reel 90 and is moved downwardly around the trailing sidewall 52 of the cylinder 53, in the troughs between adjacent blades 96 and reel sections 92, and dropped through the lower cylinder opening 56, into the spreading housing 60, and onto the spreading reel 120, whose blades 130, at the top of the spreading cylinder, chop and throw manure rearwardly toward, and sometimes against the rear sidewall 58 of the housing 60. Some of the manure deposited upon the spreading reel accumulates in the troughs between adjacent blades 130, and is carried rearwardly and downwardly around the reel 120 and drops, or is thrown, onto the ground in a controlled and even manner. As shown in FIGURE 4, the lower half of the spreading reel 120 extends below the housing 60, but the bottom of the reel 120 is spaced upwardly, at a relatively great distance above the ground G, so as to clear obstacles and vegetation on the ground, and to provide a good free drop of the manure onto the ground.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A fluid material spreader comprising a wheeled horizontal frame, a hopper mounted upon the frame and having sidewalls and a bottom wall, a discharge opening extending across said bottom and spaced from the ends of the bottom wall, a feeding cylinder disposed beneath said bottom wall and comprising opposed and concentric arcuate sidewalls having upper ends fixed to the hopper bottom wall at related sides of the discharge opening, said cylinder sidewalls having lower ends, said lower ends being spaced from each other to define a bottom opening for the cylinders, a spreading housing beneath said feeding cylinder, said housing having opposed and downwardly diverging sidewalls having free lower ends and upper ends, the upper ends of the housing sidewalls being fixed to the lower ends of the feeding cylinder sidewalls, a feeding reel mounted concentrically in said feeding cylinder and having blades in wiping contact with the feeding cylinder sidewalls, and a bladed spreading reel mounted axially in said housing and spaced from the housing sidewalls, said spreading reel being spaced beneath said bottom opening, and means for simultaneously rotating said reels, said feeding roller comprising relatively narrow circumferentially adjacent sections having leading edges and trailing edges, laterally outwardly extending leading flanges on said leading edges and laterally inwardly extending trailing flanges on said trailing edges, the leading and trailing flanges being registered at related ends of the section, said blades being flexible and resilient and being wider than the leading and trailing flanges, said blades having inner edge portions engaged between related leading and trailing flanges and outer edge portions reaching radially outwardly therefrom, and means connecting the related flanges and holding the blades in place.

2. A fluid material spreader comprising a wheeled horizontal frame, a hopper mounted upon the frame and having sidewalls and a bottom wall, a discharge opening extending across said bottom and spaced from the ends of the bottom wall, a feeding cylinder disposed beneath said bottom wall and comprising opposed and concentric arcuate sidewalls having upper ends fixed to the hopper bottom wall at related sides of the discharge opening, said cylinder sidewalls having lower ends, said lower ends being spaced from each other to define a bottom opening for the cylinders, a spreading housing beneath said feeding cylinder, said housing having opposed and downwardly diverging sidewalls having free lower ends and upper ends, the upper ends of the housing sidewalls being fixed to the lower ends of the feeding cylinder sidewalls, a feeding reel mounted concentrically in said feeding cylinder and having blades in wiping contact with the feeding cylinder sidewalls, and a bladed spreading reel mounted axially in said housing and spaced from the housing sidewalls, said spreading reel being spaced beneath said bottom opening, and means for simultaneously rotating said reels, said feeding roller comprising relatively narrow circumferentially adjacent sections having leading edges and trailing edges, laterally outwardly extending leading flanges on said leading edges and laterally outwardly extending trailing flanges on said trailing edges, the leading and trailing flanges being registered at related ends of the section, said blades being flexible and resilient and being wider than the leading and trailing flanges, said blades having inner edge portions engaged between related leading and trailing flanges and outer edge portions reaching radially outwardly therefrom, and means connecting the related flanges and holding the blades in place, said spreader reel sections being arcuate in cross section, adjacent sections being canted relative to each other to define troughs between adjacent blades which are deeper at the leading sides of the troughs then at the trailing sides thereof.

References Cited in the file of this patent

UNITED STATES PATENTS

| | | |
|---|---|---|
| 1,663,787 | Zachrison | Mar. 27, 1928 |
| 2,339,923 | Griswold et al. | Jan. 25, 1944 |
| 2,367,311 | Reece | Jan. 16, 1945 |
| 2,498,833 | Weyer | Feb. 28, 1950 |
| 2,750,123 | Keiper | June 12, 1956 |
| 2,767,963 | Ringen et al. | Oct. 23, 1956 |
| 2,797,847 | Barber et al. | July 2, 1957 |
| 2,899,111 | Christensen | Aug. 11, 1959 |